Patented Nov. 9, 1937

2,098,257

UNITED STATES PATENT OFFICE 2,098,257

FUNGICIDAL AND INSECTICIDAL COMPOSITIONS

Paul Donald Peterson, Newark, Del., assignor to Freeport Sulphur Company, New York, N. Y., a corporation of Delaware No Drawing. Application September 19, 1934, Serial No. 744,740

17 Claims. (Cl. 167—21)

This invention relates to fungicides and insecticides, and particularly to compositions utilizable for such purposes containing ingredients that reduce the hazard of injury when such sprays are applied to plants for the purpose of disease and insect control.

In the prior art, sulphur fungicides, of which lime sulphur (calcium polysulphide) may be taken as exemplary, have been suggested for and have actually been utilized rather widely, but many difficulties have arisen in such utilization of lime sulphur, for example, with resulting burning of plants and defoliation. Suggestions have been made for alleviation of these difficulties, but they have not proved satisfactory. For example, rather large additions of lime (calcium hydroxide) are frequently recommended for use with lime sulphur-lead arsenate combinations, the primary purpose of the lime additions being to reduce the hazard of spray burn. Similarly, among users of lime sulphur (calcium polysulphide) it has been a rather common practice to alter this compound by chemical precipitation prior to its application to the tender parts of plants; the primary purpose of such chemical precipitation being that of rendering the material less toxic to plant foliage. Such additions, however, not only involve the use of considerable quantities of materials, but their use frequently results in a sacrifice of many of the more desirable properties of the polysulphides, gaining safety only at the expense of control efficiency.

One of the difficulties of utilizing the lime sulphur type fungicides resides in the fact that in the presence of added insecticidal components, such as lead arsenate, metathetical reactions take place resulting in the production of lead sulphide, and also in the release of hydrogen sulphide. Such reactions take place quite rapidly, and even when such compositions are admixed and immediately sprayed, the metathetical reactions referred to are so rapid that instant changes take place before the compositions can be applied to the plants, resulting in hazardous conditions.

Further certain usage of the lime sulphur-lead arsenate types of combinations has hitherto been considered quite dangerous, as for example in their use on apples. A condition results which has been referred to as polysulphide shock. To avoid so-called polysulphide shock, attempts have been made to reduce the concentration of the liquid lime sulphur to less caustic levels. This, however, has frequently resulted in disastrous results, such as substantially complete defoliation, due apparently to an increased reaction between the diluted lime sulphur solution and the lead arsenate, presumably resulting in the release of the arsenic in a very toxic, soluble form.

The soluble polysulphides like lime sulphur (calcium polysulphide) in aqueous solution exhibit a tendency to what may be referred to as "normal break down of the polysulphides" with the production of a sulphur film. But such normal break down of the polysulphides under normal conditions is relatively slow, and no utilization of this feature has been made in the prior art.

Among the objects and advantages of the present invention is the production of fungicidal and/or fungicidal and insecticidal compositions, particularly of the lime sulphur type, as exemplary of the fungicidal compositions, and lime sulphur-lead arsenate compositions as exemplary of the fungicidal and insecticidal combinations, which are relatively stable in the spray tank to the extent that no immediate chemical change takes place in the mix of the undesirable metathetical type referred to above, and which compositions have materially improved and unique properties from the standpoint of securing adequate disease and insect control while eliminating the hazard of injury to the plant on which such compositions are used.

Other objects and advantages include the production of compositions containing the sulphur type fungicides, illustrated by lime sulphur, in which the normal break down of the polysulphides is accelerated to produce a more pronounced sulphur film, which is rapidly formed on the plant foliage as an adherent layer or film, and thus serves to produce substantial retention of residues formed from the fungicidal and insecticidal compositions.

Other and further objects and advantages will appear from the more detailed description set forth below, it being understood, however, that this more detailed description is given by way of illustration and explanation only, and not by way of limitation, since various changes may be made herein by those skilled in the art, without departing from the scope and spirit of the present invention.

In accordance with the present invention, materials of protective and catalytic nature are added to the lime-sulphur solution at dilutions suitable for plant sprays with the result that any immediate chemical change of the mixture in the spray tank is avoided, but such added materials greatly accelerate the normal break down of the polysulphides on the plant foliage, thus preserving the desirable properties of the protective residue while shortening greatly the caustic life of the polysulphides.

Manganese compounds have been found to be utilizable for this purpose, and soluble manganese salts used in catalytic proportions have given unique results in preventing the chemical changes of the mixtures like lime-sulphur-lead arsenate combinations, in the spray tank, while such soluble manganese salts are exemplary of substances that greatly accelerate a normal break down of the polysulphides with the formation of the desired sulphur films, and they may, therefore, be referred to as sulphur-film forming catalysts.

Thus the sulphur-film accelerating catalysts, such as the soluble manganese salts referred to, may be desirably employed in various types of fungicidal and insecticidal compositions which utilize soluble sulphur fungicidal components, particularly of the lime sulphur type. In the presence of such soluble manganese salts, utilized in catalytic proportions, there is a rapid acceleration in the formation of the desired sulphur film resulting from the so-called normal break down of the polysulphides, while when used in the combinations containing such lime-sulphur materials with the arsenical, such as lead arsenate, there is a material slowing down of the reaction of the components of the mixture.

The most desirable results are secured, however, by the utilization of the soluble manganese salts in the presence of protective colloids. Various protective colloids may thus be employed, as for example, skimmed milk, blood albumen, egg albumen, flour, etc. Thus while the soluble manganese salts exhibit some inhibitory value of moment as indicated above, the utilization of combinations including the soluble manganese compounds together with the protective colloid, have been found to give improved and quite unique properties in admixture as a protectant in the spray tank, far in excess of the sum of any inhibitory values of the individual components themselves. The combination not only effectively inhibits reaction in the spray tank and subsequently on the foliage, but also catalyzes the break down of the polysulphides on the plant foliage, thus serving a dual function.

In the production of the lime sulphur-lead arsenate types of combinations, the admixture of these ingredients should take place in the presence of the soluble manganese compounds, and for most effective results in preventing the reaction between lime sulphur and lead arsenate the inhibitory and catalytic mixture is desirably blended with the lead arsenate in the form of a thick creamy paste prior to the addition of the lead arsenate to the diluted lime sulphur sprays, although the additions may be made separately.

The exact mechanism of the practical protective effects secured in accordance with the present invention has not as yet been definitely ascertained, but it may be suggested that the protective effect seems to involve the coating of the lead arsenate particles with a thin layer of protective colloid, which in turn contains a small amount of the manganese compound, the combination presenting an effective barrier against penetration by the chemically active fractions of the polysulphide, presumably catalyzing the break down of such fractions at or in the boundary of the protective film, thus building up a further protective wall of precipitated sulphur around the arsenical particles, and effectively preventing the usual reaction between the arsenical and lime sulphur. The features of protection involved are of utility in the case of other sulphides than lime sulphide (calcium polysulphide) and their utilization in connection with soluble polysulphides in general may be particularly emphasized, as well as their utilization in mixtures other than those referred to herein by way of illustration.

The catalytic action of the soluble manganese salts is illustrated by the effects obtained with increasing and decreasing amounts of the manganese ingredient in the composition. Manganese sulphate may be utilized as illustrative of the soluble manganese compound. This salt when added to dilute solutions of lime sulphur (for example: a 2% solution of 32° Bé. lime sulphur in water) at concentrations of approximately 0.125% and above reacts immediately with the polysulphides to form a pinkish, flocculent precipitate. For the complete chemical precipitation of the polysulphide, concentrations of manganese sulphate above 1% are needed. On the contrary, the optimum concentration for the catalytic breakdown of the polysulphides on the foliage lies in the more desirable range of 0.015 to 0.06% of the manganese salt, with the 0.03% the most desirable dilution. Higher concentrations than this tend to lower the efficiency of the catalyst in preventing the reaction between calcium polysulphide and lead arsenate; whereas lower concentrations than those referred to are progressively less effective both in accelerating polysulphide breakdown and in inhibiting the sulphide reaction.

The following tabulation of results illustrates features of this invention by the utilization of combinations of manganese sulphate in lime sulphur and lead arsenate combinations in the presence of, for example, powdered skimmed milk as a protective colloid:

| | $MnSO_4 \cdot 4H_2O$ dilutions | Milk conc. | L-S conc. | Lead Ars. | Time of darkening |
|---|---|---|---|---|---|
| | Percent | Percent | Percent | Percent | |
| 1 | 0.10 | .125 | 2.0 | .25 | 5 minutes (greenish black). |
| 2 | .08 | .125 | 2.0 | .25 | 8 minutes (greenish black). |
| 3 | .06 | .125 | 2.0 | .25 | Yellowish green after 22 hours. |
| 4 | .04 | .125 | 2.0 | .25 | Greenish yellow after 22 hours. |
| 5 | .035 | .125 | 2.0 | .25 | Do. |
| 6 | .03 | .125 | 2.0 | .25 | Do. |
| 7 | .025 | .125 | 2.0 | .25 | Do. |
| 8 | .02 | .125 | 2.0 | .25 | Do. |
| 9 | .015 | .125 | 2.0 | .25 | Yellowish green after 22 hours. |
| 10 | No Mn | .125 | 2.0 | .25 | Greenish black in 2 minutes. |

As noted, the most desirable effects in preventing the reaction between lime sulphur and lead arsenate indicate that the manganese carrier should be confined to catalytic proportions as set forth in the table given above, but the quantity of the protective colloid may be varied to suit the several purposes for which such additions may be made. If used for protectant purposes only, that is to inhibit the lead sulphide reaction in the spray tank, proportions approximating those of the catalyst are effective; if "spreading" properties and maximum protection are desired, the protective colloid is increased to proportions approximating an 0.25% solution. An optimum dosage of powdered skimmed milk providing both spreading and maximum "protection" is secured by an approximate 0.125% solution in the diluted spray mixture. The following table illustrates the results obtained by varying the milk content of milk-manganese sulphate combinations on the efficiency of the mixture in preventing lead sulphide formation in lime sulphur-lead arsenate spray mixtures:

| Test number | Dried skim milk dilutions | $MnSO_4.4H_2O$ dilutions | Lime sulphur dilutions | Lead arsenate dilutions | Rate of darkening |
|---|---|---|---|---|---|
| | Percent | Percent | Percent | Percent | |
| 1 | 0.25 | 0.018 | 2.0 | 0.25 | Slightly darkened after 24 hrs. |
| 2 | .125 | .018 | 2.0 | .25 | Do. |
| 3 | .063 | .018 | 2.0 | .25 | Slightly darker than #1 and #2 after 24 hrs. |
| 4 | 32 | .018 | 2.0 | .25 | Darkening not complete after 24 hrs. |
| 5 | .018 | .018 | 2.0 | .25 | One hour to darken. |
| 6 | .25 | No $MnSO_4$ | 2.0 | .25 | Five minutes to darken. |
| 7 | No milk | No $MnSO_4$ | 2.0 | .25 | One minute to darken. |
| 8 | No milk | .018 | 2.0 | .25 | Fifteen minutes to darken. |

Note: Rate of darkening is based on #7 as a standard of comparison.

The practicability of these mixtures is evidenced by the fact that the optimum proportions indicated, for example 0.015 to 0.06% of manganese sulphate ($MnSO_4.4H_2O$) and 0.125% powdered skim milk are effective for all proportions of lime sulphur and lead arsenate that are considered safe for summer spraying. For example, one pound of powdered skim milk containing 4 ounces of $MnSO_4.4H_2O$ when added to 100 gallons of the diluted spray mixture will provide optimum protection, catalysis and spreading for lime sulphur concentrations of 2.5% or less, of 32° Bé. liquid lime sulphur and lead arsenate concentrations of 0.75%, or less. The maximum concentration of liquid lime sulphur for summer usage approximates a 2.5% mixture (2.5 gallons 32° Bé. liquid lime sulphur in 100 gallons of the diluted spray mixture). Arsenate of lead is seldom used at concentrations as high as a maximum dosage indicated above. 3 pounds of lead arsenate powder in 100 gallons of water is a common recommendation for use on apples. This approximates a 0.37% dosage.

A further practical use of the protective mixture in accordance with the present invention, a use that is not so readily apparent, is exemplified in its utility in permitting practices considered dangerous in the prior art. Particular reference may be made to the use of lime sulphur-lead arsenate combinations on apples. Reference has been made above to the polysulphide shock which has been obtained, and the attempts to reduce such shock by reduction of the concentraton of the liquid lime sulphur to less caustic levels. However, in such cases disastrous results, including complete defoliation were obtained. On the contrary, when the protective catalytic mixture of the present invention is utilized with combinations of lead arsenate and lime sulphur, in which the lime sulphur is diluted through the range of 1-40, 1-50, 1-60, 1-80, 1-100, etc., the mixture becomes progressively less caustic. The latter dilution 1-100 with 2 lbs. of lead arsenate has been used on peaches without apparent injury to either foliage or tender stems.

Not only are extreme lime sulphur dilutions with lead arsenate made feasible, but the value of the mixture as a summer spray on tender foliage takes on a special significance for use in further combinations with wettable sulphurs. The utility of the latter is frequently limited by their low toxic levels on the one hand, and their low adherence as compared to liquid lime sulphur residues on the other. It has been found that lime sulphur alone can be used in combination with wettable sulphur not only to increase the toxic level of the mixture, but also to increase the adherence of the final residue. This use of lime sulphur as a "sticker" for wettable sulphurs has distinct advantages over prior art practice of adding a fungicidally and insecticidally inert "sticker" to wettable sulphurs. The prior art practice usually results in a more adherent but less effective residue; while the practice in accordance with the present invention yields a more adherent and more effective residue.

The utilization of a soluble manganese salt for catalytically accelerating the formation of sulphur films on foliage results in sulphur films to which the residues of the fungicidal and insecticidal combinations more effectively adhere. These features, therefore, may be utilized in connection with securing adherence and more permanent action of various types of insecticidal and fungicidal components, and the arsenicals illustrated by lead arsenate, copper arsenate, etc., are exemplary of the broader class of insecticidal components that thus may be "anchored" to the foliage by means of the catalyzed and accelerated sulphur film produced in accordance with the present invention. Similarly other types of insecticidal components, such as plant extracts, for example, rotenone, etc. may be utilized with the lime sulphur-manganese salt combinations for this purpose. Similarly the wettable sulphurs are adherently anchored to the foliage of the plant by means of the accelerated sulphur film produced by the utilization of compositions in accordance with the present invention.

While the practice indicated above has been feasible for simple lime sulphur-wettable sulphur mixtures, the addition of lead arsenate or similar materials, as in codling moth control, is subject to considerations analogous to those pointed out above in connection with the lime sulphur-lead arsenate combination. Combined with the protective mixtures produced in accordance with the present invention, however, weak concentrations (1-100) of lime sulphur with lead arsenate and wettable sulphur have proved safe even on such tender foliage as peaches, plums and cherries, and effective in insect and disease control on apples. The resultant residue is unique in its adherent properties. Trees sprayed with this mixture retain a conspicuous, visible residue long after trees sprayed with equivalent sulphur dosages of wettable sulphur-lead arsenate and lime sulphur-lead arsenate combinations cease to show a visible residue.

As particularly exemplary of the manganese compounds that may be utilized in accordance with the present invention, reference may be made to the inorganic salts like manganese sulphate and manganese chloride, as well as the organic manganese salts, such as the tartrates, lactates, etc.

In utilizing compositions produced in accordance with the present invention, the combinations of materials like the lime sulphur-lead arsenate materials, are usually produced in the mixing tank of the sprayer equipment immediately prior to utilization, and such mixtures then promptly sprayed. However, in accordance with the present invention, the protecting salts, like the soluble manganese salts, may be added to components to be utilized in the production of fungicidal and insecticidal compositions, and marketed in that condition. For example, the lead arsenate or similar insecticidal component may be combined with the soluble manganese salt in catalytic proportions, and similarly any spray insecticidal component may be utilized as a carrier for the sulphur-film forming catalyst, the combination being a marketable entity that may be utilized in the production of the desired compositions in accordance with the present invention. Similarly the sulphur-film forming catalyst may be incorporated in any fungicidal or insecticidal component and marketed as such for utilization in production of desired compositions.

The protective colloid may also serve as a carrier for the hazard reducing component, such as the manganese soluble salt referred to. Protective colloids are widely used in the production of fungicidal and insecticidal compositions. And consequently the protective colloid, whether milk, albumen, or other type of material, may be utilized as the carrier for the hazard reducing component. In such utilization, of the protective colloid as the carrier for the hazard reducing component, the invention is in no way limited to the utilization of soluble manganese salts, as this feature of utilizing the protective colloid as a carrier for a desired component is of wide utility, and it offers a particularly desirable means of marketing a desired protective colloid combined with the hazard reducing component, such as the soluble manganese salt. For example, the milk component in dry condition may be incorporated with the desired manganese salt, preferably using the latter in the catalytic proportions in which it will be employed in the final spray material. Or more desirably, the manganese salt in aqueous solution may be added to the milk component before the spray drying operation, so that the final spray dried milk component will then carry the hazard reducing component, such as the soluble manganese salts, uniformly dispersed in its structure. The methods of incorporating the protective colloids of any desired type, with the hazard reducing components, are exemplary only, and any desired methods of causing such combinations may be employed. In utilizing the sulphur-film forming catalyst, such as the soluble manganese salts, the proportions of such manganese salt in the combination should be limited to the catalytic proportions, so that the addition of a given amount of protective colloid will introduce the desired hazard reducing component in the catalytic proportions desired in the final spray material.

While manganese salts have been particularly emphasized above in carrying out the present invention, other metallic salts exhibit the property of catalyzing polysulphide breakdown. With many of such salts however, the catalysis is not appreciable, while in other cases, additional factors are involved which make their utilization less desirable. Thus the soluble nickel salts, as exemplified by nickel sulphate, show appreciable catalytic properties, while however nickel sulphate approximates manganese sulphate closely in catalyzing polysulphide breakdown, the polysulphide-nickel sulphate mixture blackens instantly due presumably to the formation of black nickel sulphide. In some cases, metallic salts may catalyze polysulphide breakdown without acting substantially in the "protective" capacity of manganese sulphate in lime sulphur-lead arsenate mixtures, and such salts may be used where the first named capacity is desired without necessarily obtaining the "protective" action of the manganese compounds.

Having thus set forth my invention, I claim:

1. A fungicidal composition adapted for use in fungicidal sprays, containing a soluble polysulphide, and a manganese compound in catalytic proportions acting as a sulphur-film forming catalyst.

2. A fungicidal composition containing lime sulphur and manganese sulphate in catalytic proportions.

3. A fungicide and insecticide containing a soluble polysulphide, a soluble manganese salt in catalytic proportions, and a protective colloid.

4. A fungicide containing lime sulphur, manganese sulphate in catalytic proportions, and milk.

5. A fungicidal and insecticidal composition containing a soluble polysulphide, a soluble manganese salt in catalytic proportions, and an insecticide.

6. A fungicidal and insecticidal composition containing a soluble polysulphide, a soluble manganese salt in catalytic proportions, an insecticidal component, and a protective colloid.

7. A fungicidal and insecticidal composition containing a soluble polysulphide, a soluble manganese salt in catalytic proportions, and an insecticide including a spray arsenical.

8. A fungicidal and insecticidal composition containing lime sulphur, a soluble manganese salt in catalytic proportions, lead arsenate, and a protective colloid.

9. A fungicidal and insecticidal composition containing lime sulphur, a manganese sulphate in an amount of from .01% to .08%, milk, and lead arsenate.

10. A spray insecticide compatible with a polysulphide and containing a soluble manganese salt in catalytic proportions, said composition on admixture with a solution of a polysulphide yielding a compatible composition in which the manganese salt acts as a sulphur-film forming catalyst.

11. A spray arsenical containing a soluble manganese salt in catalytic proportions.

12. Lead arsenate carrying a soluble manganese salt in catalytic proportions.

13. As a component for fungicides and insecticides: a protective colloid carrying a soluble manganese salt in catalytic proportions.

14. A fungicidal composition containing a soluble polysulphide, a manganese compound acting as a sulphur-film forming catalyst, and a wettable sulphur.

15. The process of forming fungicidal and insecticidal compositions which comprises admixing lime sulphur and lead arsenate in aqueous solution in the presence of a soluble manganese salt, the latter being present in catalytic proportions.

16. A fungicidal composition containing lime sulphur, a manganese compound acting as a sulphur-film forming catalyst, and a wettable sulphur.

17. The process which comprises spraying foliage with a sulphur fungicide carrying a manganese compound in catalytic proportions.

PAUL DONALD PETERSON.